(12) United States Patent
Hashimoto et al.

(10) Patent No.: US 6,512,559 B1
(45) Date of Patent: Jan. 28, 2003

(54) REFLECTION-TYPE LIQUID CRYSTAL DISPLAY DEVICE WITH VERY EFFICIENT REFLECTANCE

(75) Inventors: Kengo Hashimoto, Kashiwa (JP); Shun Ueki, Tenri (JP); Seiichi Mitsui, Kashiwa (JP)

(73) Assignee: Sharp Kabushiki Kaisha, Osaka (JP)

( * ) Notice: Subject to any disclaimer, the term of this patent is extended or adjusted under 35 U.S.C. 154(b) by 27 days.

(21) Appl. No.: 09/697,073

(22) Filed: Oct. 27, 2000

(30) Foreign Application Priority Data

Oct. 28, 1999 (JP) .......................................... 11-307618

(51) Int. Cl.$^7$ ........................................... G02F 1/1347
(52) U.S. Cl. .............................. 349/74; 349/76; 349/77; 349/81
(58) Field of Search ............................. 349/74–76, 114, 349/81

(56) References Cited

U.S. PATENT DOCUMENTS 6,184,951 B1 * 2/2001 Harrold et al. ................ 349/74

FOREIGN PATENT DOCUMENTS

| JP | 52-129450 | 10/1977 |
|----|-----------|---------|
| JP | 54-26756 | 2/1979 |
| JP | 7-218906 | 8/1995 |
| JP | 11-38452 | 2/1999 |
| WO | WO 95/17303 | 6/1995 |

OTHER PUBLICATIONS

"Electro–Optical Properties of Reflective Type LCD", K. Nakamura et al., 3D110, *18$^{th}$* Liquid Crystal Forum, pp. 288–289, 1992.
"Polarization/Reflection Film, RDF–B (for Reflective LCDs) and RDF–C (for Reflective/Transflective LCDs)", OPP–049–A(049803)TY, a Catalog by Sumitmoto 3M.
"Reflective Color LCDs with Lighting System", O. Okumura, *Electronic Display Forum '98 Proceedings*, pp. 4–16 to 4–21, 1998.

* cited by examiner

*Primary Examiner*—James Dudek
*Assistant Examiner*—Timothy Rude
(74) *Attorney, Agent, or Firm*—Birch, Stewart, Kolasch & Birch, LLP

(57) ABSTRACT

A reflection-type liquid crystal display device includes a first liquid crystal display layer having a first liquid crystal layer including a liquid crystal molecule, a p-type dichroic dye and a polymer; a reflecting polarizer disposed to transmit linearly polarized light having a polarization direction in a transmitted axis direction of the first liquid crystal display layer; and the second liquid crystal display layer including a polarizer disposed to transmit the linearly polarized light transmitted through the first liquid crystal display layer and reflecting polarizer, a second liquid crystal layer capable of bright/dark display depending on presence or absence of an applied voltage, and a reflector, wherein the first liquid crystal display layer, reflecting polarizer and second liquid crystal display layer are stacked in this order from the side light is incident from, thus providing a reflection-type liquid crystal display device with desirable display quality, capable of bright and high-contrast display.

22 Claims, 10 Drawing Sheets

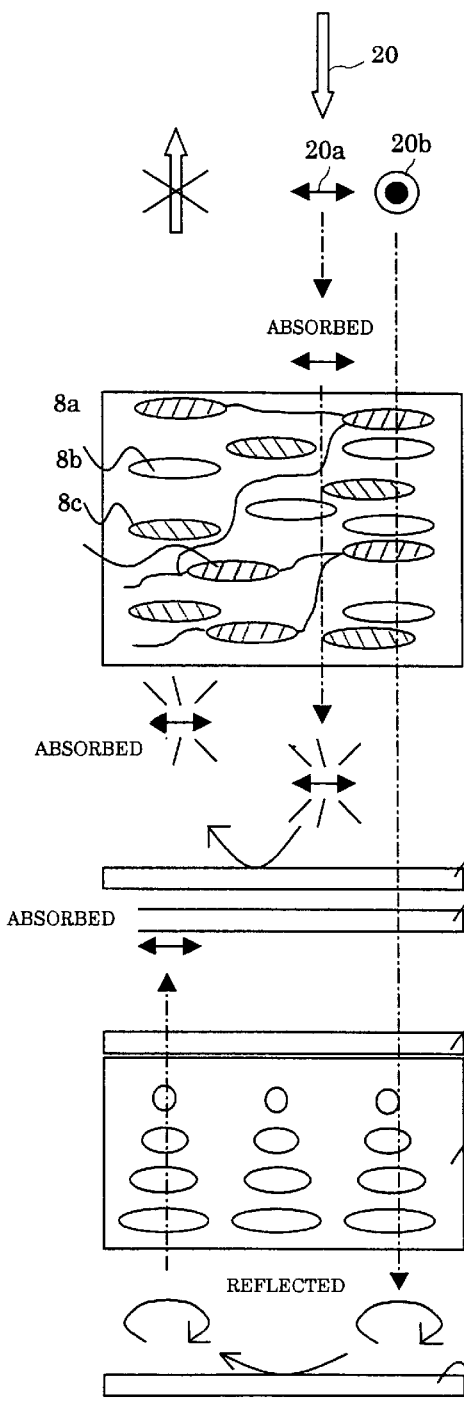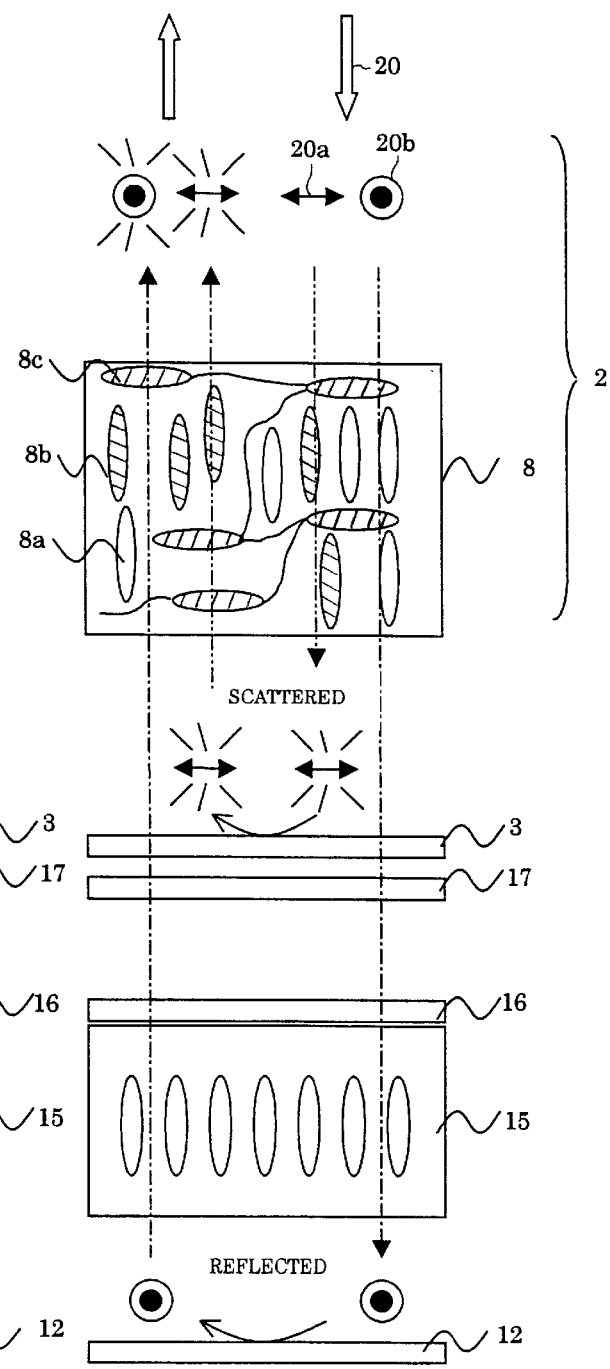
FIG. 4(a) WHEN APPLYING NO VOLTAGE
FIG. 4(b) WHEN APPLYING VOLTAGE

CONTRAST = 17.6

BRIGHTNESS = 15.8%

CONTRAST = 9.4

BRIGHTNESS = 5.3%

CONTRAST = 7.4

BRIGHTNESS = 9.3%

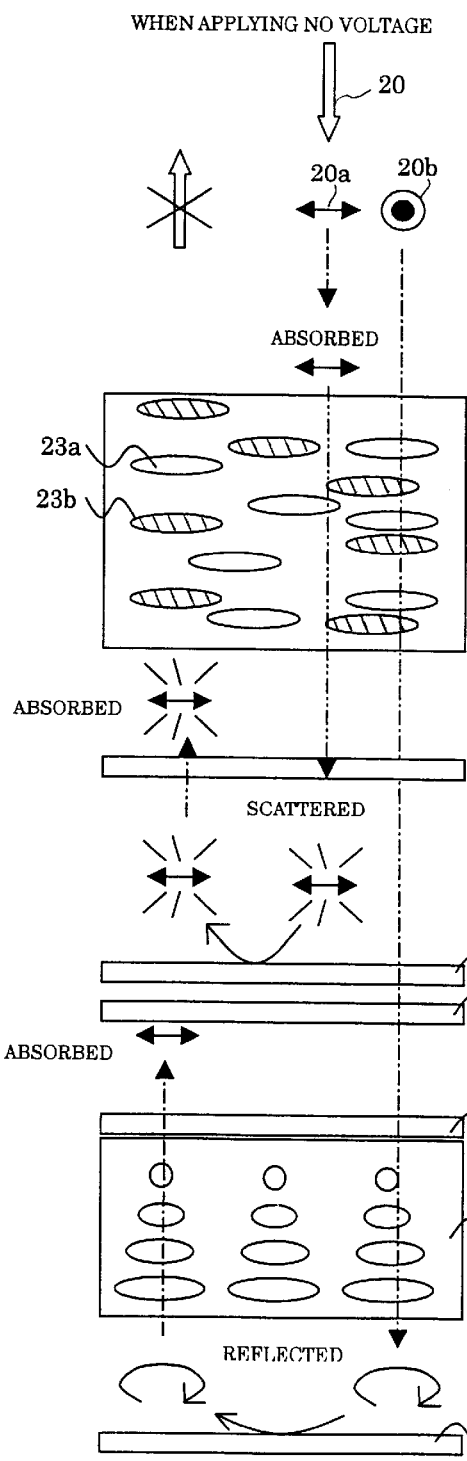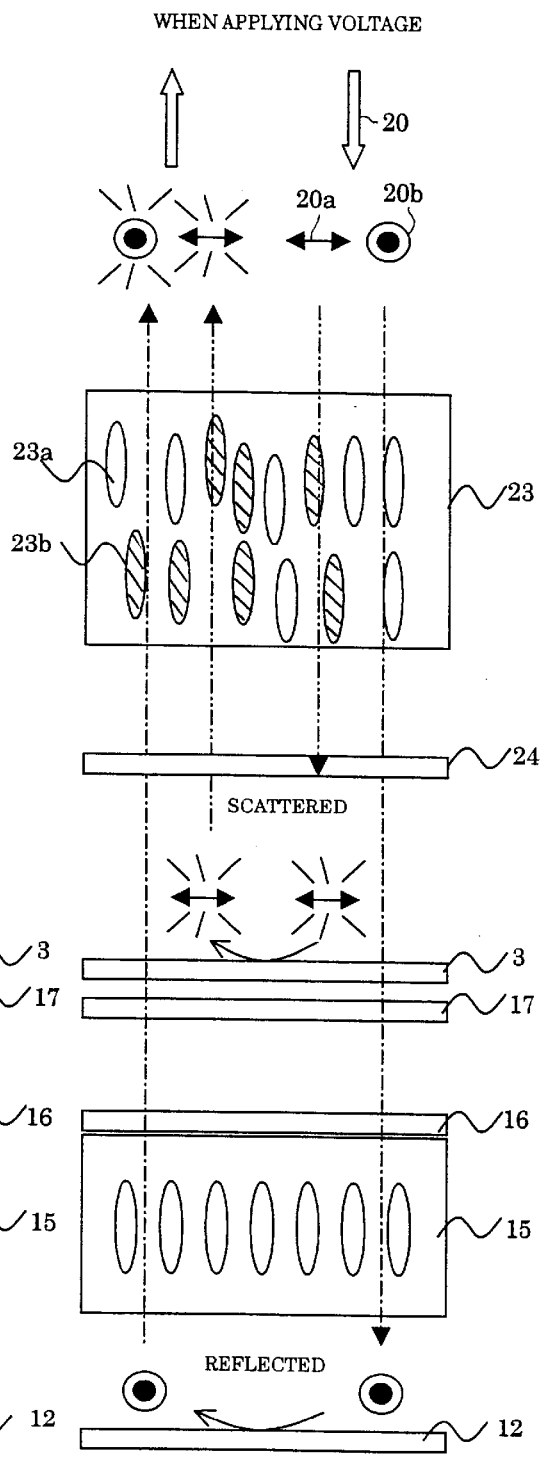

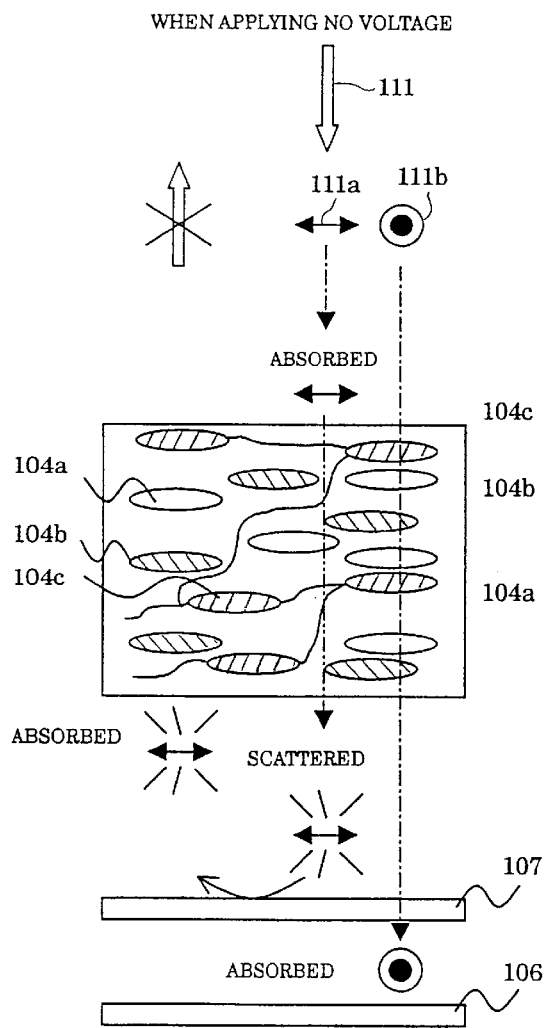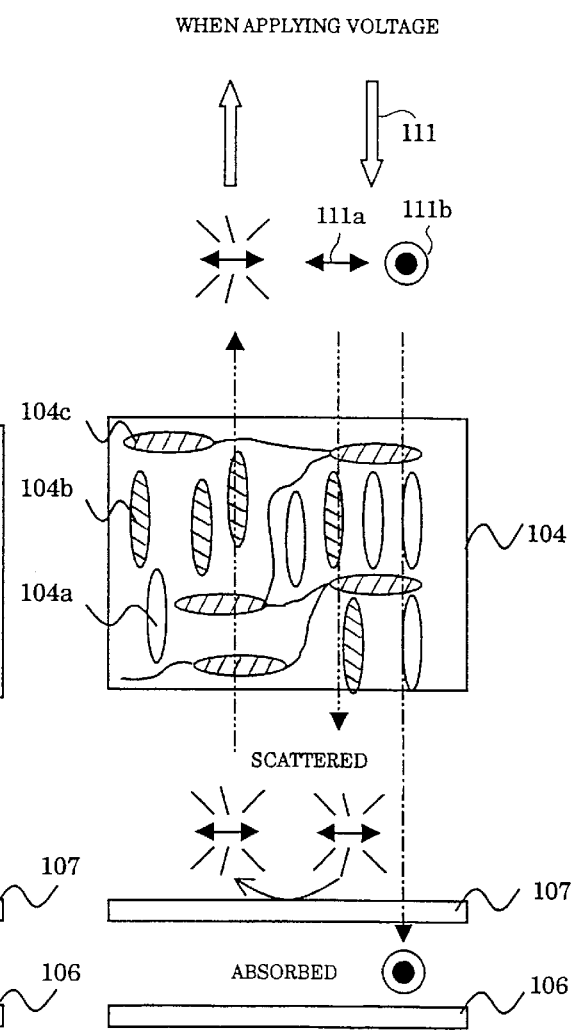

REFLECTION-TYPE LIQUID CRYSTAL DISPLAY DEVICE WITH VERY EFFICIENT REFLECTANCE

FIELD OF THE INVENTION

The present invention relates to a reflection-type liquid crystal display device, and in particular to a reflection-type liquid crystal display device employing a Guest Host (GH) type display mode using a reflecting polarizer.

BACKGROUND OF THE INVENTION

Conventionally known is a reflection-type liquid crystal display device capable of modulating incident light between scattering (bright state) and absorption (dark state) by an application of a voltage, by dispersing a polymer having an anisotropic scattering function in a liquid crystal element employing a GH-type display mode in which a dichroic dye (Guest) having anisotropy in absorption of visible light in respective directions of a long axis and a short axis of a molecule is mixed with a liquid crystal (Host) having a certain molecular arrangement. The following will explain the conventional reflection-type liquid crystal display device as above based on FIG. 9.

A reflection-type liquid crystal display (LCD) device 101 shown in FIG. 9 is made up of a first substrate 102, a second substrate 103 and a liquid crystal layer 104 which is a complex layer composed of the dichroic dye, liquid crystal and polymer, sandwiched between the first substrate 102 and second substrate 103.

The first substrate 102 includes an insulating plate 105a which is a substrate, an absorbing later 106, a reflecting polarizer 107, a transparent electrode 108a and an orientation membrane 109a, which are provided in this order from the side of the insulating plate 105a and between the insulating plate 105a and the liquid crystal layer 104. Note that, in FIG. 9, 110 is a seal material.

The second substrate 103 includes an insulating plate 105b as a substrate, a transparent electrode 108b, an orientation membrane 109b, which are provided in this order from the side of the insulating plate 105b and between the insulating plate 105b and the liquid crystal layer 104.

The liquid crystal layer 104 which is placed between the first substrate 102 and second substrate 103 is made up of a liquid crystal molecule 104a of a nematic liquid crystal having a positive dielectric anisotropy, a so-called p-type dichroic dye 104b having a transitional dipole moment which is substantially parallel to the long axis of the molecule, and a polymer of polymerized molecules (polymer) 104c having an anisotropic molecular skeleton.

The insulating plate 105a of the first substrate 102, and the insulating plate 105b of the second substrate 103 are composed of an insulating material, for example, such as glass, quartz and plastic. Further, at least the insulating plate 105b of the second substrate 103 is formed of a material having light transmissivity.

On a surface of the insulating plate 105a of the first substrate 102 on the side of the liquid crystal layer 104 are formed the absorbing layer 106 in contact with the insulating plate 105a as explained, and the reflecting polarizer 107 which is made up of, for example, a dielectric multilayer membrane having birefringence. Here, when forming the reflecting polarizer 107, a transmitted axis of the liquid crystal layer 104 and that of the reflecting polarizer 107 are lined up with each other.

Further, in the first substrate 102, the orientation membrane 109a which is provided on a surface of the reflecting polarizer 107 via the transparent electrode 108a in between, and the orientation membrane 109b which is provided under a surface of the insulating plate 105b via the transparent electrode 108b in between are made of, for example, polyimide resin. Furthermore, on respective surfaces of these orientation membranes 109a and 109b, on the sides which are in contact with the liquid crystal layer 104, an orientation treatment, for example, by rubbing is performed so as to orient the liquid crystal molecule 104a of the nematic liquid crystal horizontally in one direction with respect to the first substrate 102 and second substrate 103.

Next, the following will explain an operation when performing black and white display by using the reflection-type LCD device 101 with reference to FIGS. 10(a) and 10(b). FIG. 10(a) shows a state of the reflection-type LCD device 101 when applying no voltage while FIG. 10(b) shows a state of the reflection-type LCD device 101 when applying a voltage. Note that, light 111 which is emitted from surroundings (surrounding light) is indicated by linearly polarized light 111a having one polarization direction (oscillation direction) and linearly polarized light 111b having another oscillation direction which orthogonally intersects the former oscillation direction.

As shown in FIG. 10(a), when applying no voltage, the liquid crystal molecule 104a of the liquid crystal layer 104 is oriented along an orientation direction of the orientation membranes 109a and 109b, that is, in a direction parallel to the first substrate 102 and second substrate 103. In addition, the p-type dichroic dye 104b of the liquid crystal layer 104 is oriented in the same manner as the liquid crystal molecule 104a.

When the light 111 which is incident from the side of the second substrate 103 is incident on the liquid crystal layer 104, a component of the light 111, i.e. the linearly polarized light 111a having its oscillation direction in a direction parallel to the long axis direction of the molecule of the p-type dichroic dye 104b is absorbed by the p-type dichroic dye 104b. Some of the linearly polarized light 111a cannot be absorbed by the p-type dichroic dye 104b and is transmitted. However, since the linearly polarized light 111a thus being transmitted through the liquid crystal layer 104 was scattered by the polymer 104c and became scattering light, it is reflected at the reflecting polarizer 107 and absorbed by the p-type dichroic dye 104b when passing through the liquid crystal layer 104 again.

Further, the linearly polarized light 111b having an oscillation plane in a vertical direction with respect to the long axis direction of the molecule of the p-type dichroic dye 104b passes through the liquid crystal layer 104 and reflecting polarizer 107, and is absorbed by the absorbing layer 106 behind the reflecting polarizer 107.

Thus, most of the linearly polarized light 111a do not emerge but absorbed by the liquid crystal layer 104 and absorbing layer 106. Accordingly, when applying no voltage, most of the light which is incident on the reflection-type LCD device 101 is absorbed by the reflection-type LCD device 101, thereby resulting in a dark state.

On the other hand, as shown in FIG. 10(b), when applying the voltage, the nematic liquid crystal molecule 104a and p-type dichroic dye 104b of the liquid crystal layer 104 rise along a direction of the voltage, and are oriented in the vertical direction with respect to the first substrate 102 and second substrate 103. However, the polymers 104c are chemically bound to one another so that a direction thereof cannot be changed. As a result, there arises a difference in refractive index between an area composed of the liquid crystal molecule 104a and p-type dichroic dye 104b, the molecules of which rose along the direction of the voltage, and an area composed of the polymers 104c, molecules of which did not rise. For this reason, the light incident on the liquid crystal layer 104 takes the scattering state.

Namely, when the light 111 incident from the side of the second substrate 103 is incident on the liquid crystal layer 104, a component of the light 111, i.e. the linearly polarized light 111b having its oscillation direction in the vertical direction with respect to the long axis direction of the molecule of the p-type dichroic dye 104b passes through the liquid crystal layer 104 and reflecting polarizer 107, and is absorbed by the absorbing layer 106 behind the reflecting polarizer 107.

In addition, some of the linearly polarized light 111a having its oscillation direction in a direction parallel to the long axis direction of the molecule of the p-type dichroic dye 104b is scattered at the polymer 104c, while the other is reflected at the reflecting polarizer 107, and thereafter, passes through the liquid crystal layer 104 again to emerge, thereby showing a bright state.

A reflecting polarizer which is used as the reflecting polarizer 107 is a dielectric multilayer film having birefringence, which has a characteristic to reflect linearly polarized light having its oscillation plane in a direction of travel while transmitting linearly polarized light having its oscillation plane in a direction which orthogonally intersects the direction of travel. This reflecting polarizer is disclosed in Published Japanese Translation of PCT International Publication No. WO95/17303 for Patent Application No. PCT/US94/14323 (Tokuhyohei 9-506837 published on Jul. 8, 1997).

Incidentally, a device employing the reflecting polarizer as above is disclosed in a catalog OPP-049-A (049803)TY published by Sumitomo 3M Ltd. (3M) or in *Electronic Display Forum* 98 (pages 4–16).

In addition, the conventional reflection-type LCD device as discussed is disclosed, for example, in Japanese Unexamined Patent Publication No. 38452/1999 (Tokukaihei 11-38452 published on Feb. 12, 1999).

However, in such a structure as to provide the reflecting polarizer and absorbing layer in the order shown in the foregoing conventional reflection-type LCD device, even in the bright state, the linearly polarized light which oscillates in the orthogonal direction to the orientation direction of the liquid crystal molecule passes through the liquid crystal layer, which is a dichroic-dye/liquid-crystal/polymer complex layer, and the reflecting polarizer, and is absorbed by the absorbing layer provided behind the reflecting polarizer. Consequently, even in the bright state, about a half of the incident light is absorbed by the absorbing layer, thereby raising a problem that bright display cannot be attained in effect.

SUMMARY OF THE INVENTION

In view of the foregoing problem, it is an object of the present invention to provide a reflection-type liquid crystal display device capable of bright and high-contrast display.

In order to attain the foregoing object, a reflection-type LCD device of the present invention is made up of:

a first liquid crystal display layer having a first liquid crystal layer which includes a liquid crystal material, a dichroic dye and an anisotropic scattering material;

a reflecting polarizing layer which is disposed to transmit linearly polarized light having a polarization direction in a transmitted axis direction of the first liquid crystal display layer; and a second liquid crystal display layer including a polarizer which is disposed to transmit the linearly polarized light transmitted through the reflecting polarizing layer, a second liquid crystal layer capable of bright and dark display depending on presence or absence of an applied voltage, and a reflecting layer, wherein the first liquid crystal display layer, reflecting polarizing layer and second liquid crystal display layer are stacked in this order from a side from which light is incident.

When the dichroic dye (Guest) is mixed with the liquid crystal material (Host), a long narrow molecule of the dichroic dye is aligned parallel to the molecule of the liquid crystal material. Accordingly, when the molecular alignment of the liquid crystal molecule is changed by applying an electric field, the molecular alignment of the dichroic dye is also changed with it, thus automatically controlling the absorbed quantity of visible light by the dichroic dye. A display mode of the liquid crystal display element thus utilizing an electro-optical effect is called a Guest Host (GH) type display mode. Combining the anisotropic scattering material which scatters linearly polarized light having a polarization direction (oscillation direction) in the same direction as an orientation direction of the liquid crystal material and dichroic dye with the first liquid crystal layer employing the GH-type display mode as above enables the first liquid crystal display layer to modulate scattering and transmission of the incident linearly polarized light by an application of the electric field.

The reflecting polarizing layer which is stacked on the first liquid crystal display layer is disposed to transmit linearly polarized light of one direction which is transmitted through the first liquid crystal display layer including the first liquid crystal layer as shown above, i.e. the linear polarized light which has one polarization direction (oscillation direction) coinciding with the transmitted axis direction of the first liquid crystal display layer. Namely, the reflecting polarizing layer is disposed in such a manner as to transmit linearly polarized light having one polarization direction as above, and reflect the other linearly polarized light having a polarization direction orthogonally intersecting it. Furthermore, the polarizer making up the second liquid crystal display layer is also disposed so as to transmit the linearly polarized light of one direction which passes through the reflecting polarizing layer. Further, since the liquid crystal layer capable of bright and dark display depending on presence or absence of the applied voltage is used as the second liquid crystal layer, the linearly polarized light which passes through the polarizer to be incident on the second liquid crystal layer either becomes circularly polarized light or passes through while maintaining its polarization state, depending on presence or absence of an applied voltage.

Suppose that the arrangement of the reflection-type LCD device as explained is a first arrangement of the present invention.

Here, the following will explain an operation of the reflection-type LCD device according to the present invention in the case where the liquid crystal material and dichroic dye are, for example, aligned in the orientation direction (here, suppose that it is parallel to a substrate) when applying no electric field, while they are aligned in a direction orthogonally intersecting the orientation direction (here, suppose that it intersects perpendicularly to the substrate) when applying the electric field.

First, the following will explain the case where the voltage is not applied to both of the first and second liquid crystal layers.

When applying no voltage, the linearly polarized light incident on the first liquid crystal layer, i.e. linearly polarized light having a polarization direction (oscillation direction) in the same direction as the orientation direction of the liquid crystal material and dichroic dye, is either absorbed by the dichroic dye when passing through the first liquid crystal layer or scattered by the anisotropic scattering material. The scattering light which passed through the first liquid crystal layer is thereafter reflected at the reflecting polarizing layer, and then absorbed by the dichroic dye when passing through the first liquid crystal layer again, and thus essentially no light emerges from the device.

On the other hand, the linearly polarized light having a polarization direction orthogonally intersecting that of the above linearly polarized light is transmitted through the first liquid crystal layer without being absorbed by the dichroic dye even upon incidence on the first liquid crystal layer. Thereafter, the linearly polarized light is also transmitted through the reflecting polarizing layer and the polarizer which makes up the second liquid crystal display layer so as to enter the second liquid crystal layer. When the second liquid crystal layer is, for example, made of a twisted nematic liquid crystal which changes the linearly polarized light into the circularly polarized light when applying no voltage, this circularly polarized light becomes circularly polarized light rotating in the reverse direction, after being reflected at the reflecting layer. Consequently, when the circularly polarized light rotating in the reverse direction is incident on the polarizer again, after passing through the second liquid crystal layer, it becomes linearly polarized light having the polarization direction which is different by 90° with respect to the transmitted axis of the polarizer, and thereby the light is blocked by the polarizer.

Thus, in the state where the voltage is not applied, linearly polarized light having any polarization directions is absorbed and it does not emerge from the device, thereby realizing the dark state.

Next, the following will explain the case where the voltage is applied to both the first and second liquid crystal layers.

When applying the voltage, since the molecules of the liquid crystal material and dichroic dye both rise in the direction to intersect perpendicularly to the substrate, the foregoing linearly polarized light (linearly polarized light having the polarization direction in the same direction as the orientation direction of the liquid crystal material and dichroic dye) is not absorbed but scattered by the anisotropic scattering material when passing through the first liquid crystal layer, then, reflected at the reflecting polarizing layer and scattered by the first liquid crystal layer again, so as to emerge from the device.

On the other hand, the linearly polarized light whose polarization direction orthogonally intersects that of the above linearly polarized light is transmitted through the first liquid crystal layer, reflecting polarizing layer and polarizer, then, incident on the second liquid crystal layer. Since a phase difference does not occur in the second liquid crystal layer when applying the voltage, the linearly polarized light is transmitted through the second liquid crystal layer while maintaining its polarization state, and reflected at the reflecting layer, and thereafter, it is transmitted again through the polarizer, reflecting polarizing layer and first liquid crystal layer, so as to emerge from the device.

As discussed, when applying the voltage, linearly polarized light having any polarization directions can emerge from the device, thereby contributing to a bright state of display.

Consequently, the dark state of display can surely be realized, while making sure, in the bright state, that the linearly polarized light of one direction, which was absorbed in the conventional arrangement, can emerge from the device, i.e. both rays of the linearly polarized light incident on the reflection-type LCD device can emerge from the device.

Note that, in both of the first and second liquid crystal layers, a positive liquid crystal material which allows the molecules of the liquid crystal material and dichroic dye to rise with respect to the voltage has been used through the foregoing explanation, but a negative liquid crystal material can undoubtedly be adopted as well.

Thus, a reflection-type LCD device having desirable display quality with highly improved brightness and contrast can be realized.

Further, in order to solve the foregoing problems, the reflection-type LCD device of the present invention may have an arrangement which includes:

a first liquid crystal display layer having a first liquid crystal layer including a liquid crystal material, a dichroic dye and an anisotropic scattering material;

a reflecting polarizing layer which is disposed to transmit linearly polarized light having a polarization direction in a transmitted axis direction of the first liquid crystal display layer; and a second liquid crystal display layer including a polarizer which is disposed to transmit the linearly polarized light transmitted through the reflecting polarizing layer, a second liquid crystal layer capable of bright and dark display depending on presence or absence of an applied voltage, and a reflecting layer, wherein the first liquid crystal display layer, the reflecting polarizing layer and the second liquid crystal display layer are stacked in this order from a side from which light is incident.

Referring to this arrangement as a second arrangement of the reflection-type LCD device according to the present invention, the second arrangement realizes the first liquid crystal display layer by providing an anisotropic scattering membrane separately from the first liquid crystal layer and in replacement of the anisotropic scattering material in the first liquid crystal layer in the reflection-type LCD device having the first arrangement of the present invention, where the anisotropic scattering membrane is for transmitting linearly polarized light having a polarization direction (oscillation direction) in the same direction as an orientation direction of molecules of the liquid crystal material and dichroic dye of the first liquid crystal layer, and scattering linearly polarized light having a polarization direction which orthogonally intersects that of the above linearly polarized light. Accordingly, the reflection-type LCD device having the second arrangement of the present invention can also obtain the same effects as those of the reflection-type LCD device having the first arrangement. That is, while surely realizing the dark state of display, in the bright state, the linearly polarized light which was absorbed in the conventional arrangement emerges from the device, thus resulting in emergence of both rays of the linearly polarized light incident on the reflection-type LCD device.

Thus, the reflection-type LCD device having desirable display quality with highly improved brightness and contrast can be realized.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 4(a) is an explanatory drawing showing a state of the reflection-type liquid crystal display device when applying no voltage; and FIG. 4(b) is an explanatory drawing showing a state of the reflection-type liquid crystal display device when applying the voltage.

FIG. 8(a) is an explanatory drawing showing a state of the reflection-type liquid crystal display device when applying no voltage; and FIG. 8(b) is a state of the reflection-type liquid crystal display device when applying the voltage.

FIG. 10(a) is an explanatory drawing showing a state of the conventional reflection-type liquid crystal display device when applying no voltage; and FIG. 10(b) is an explanatory drawing showing a state of the conventional reflection-type liquid crystal display device when applying the voltage.

DESCRIPTION OF THE EMBODIMENTS

[First Embodiment]

The following will explain a First Embodiment of the present invention with reference to FIGS. 1 through 5(c).

Figure 1:
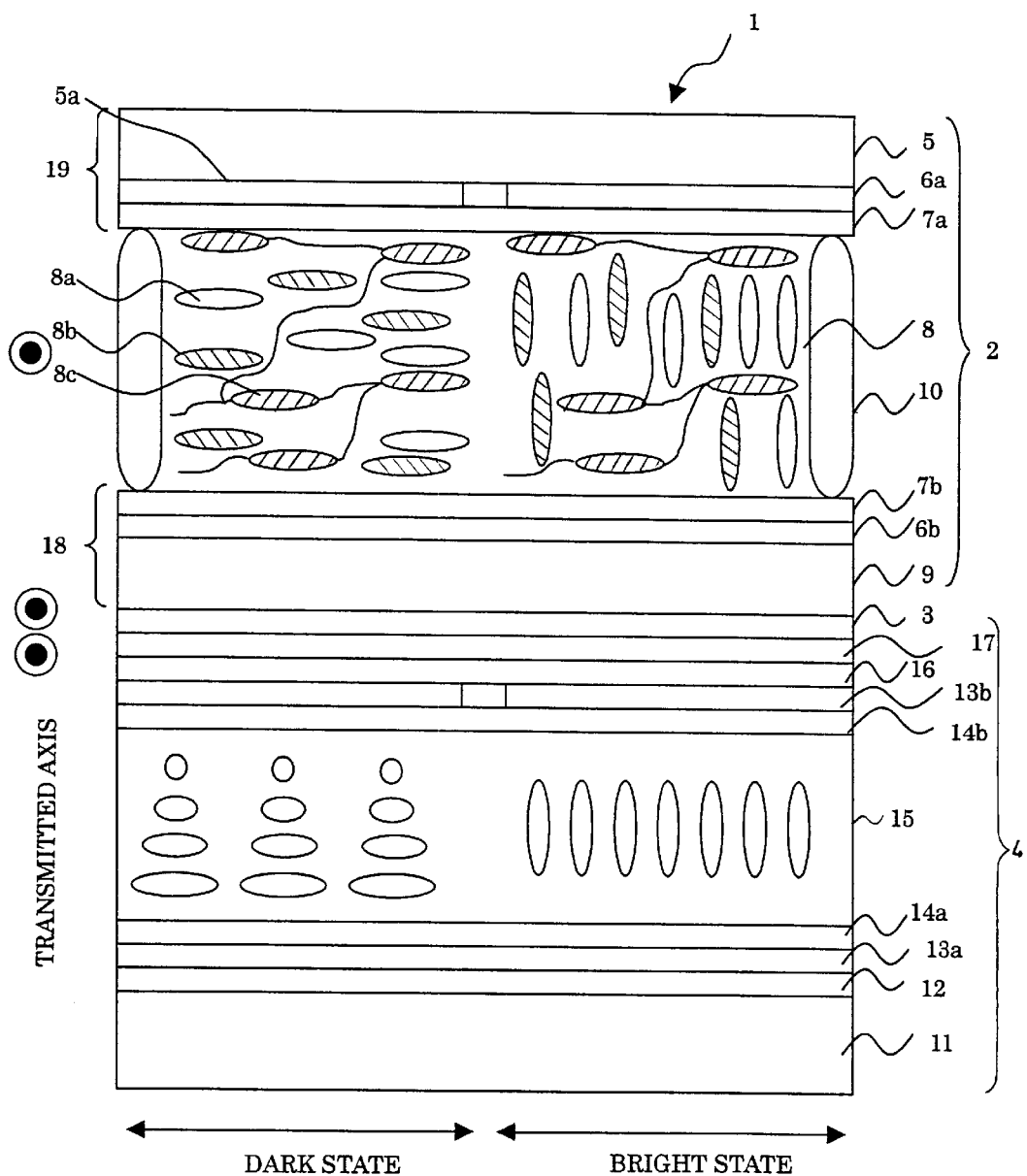
FIG. 1 is a cross sectional view showing a structure of a reflection-type liquid crystal display device according to a First Embodiment of the present invention.

FIG. 1 is a cross sectional view showing a structure of a reflection-type liquid crystal display (LCD) device 1 according to the present embodiment. As shown in FIG. 1, the reflection-type LCD device 1 includes a first liquid crystal display layer 2, a reflecting polarizer (reflecting polarizing layer) 3 and a second liquid crystal display layer 4.

The first liquid crystal display layer 2 has an arrangement which provides a first transparent electrode of upper part ("first upper transparent electrode", hereinafter) 6a, a first orientation membrane of upper part ("first upper orientation membrane", hereinafter) 7a, a first liquid crystal layer 8, a first orientation membrane of lower part ("first lower orientation membrane", hereinafter) 7b, a first transparent electrode of lower part ("first lower transparent electrode", hereinafter) 6b and a plastic film plate 9 in this order on a surface 5a of an insulating plate 5 from the side of the insulating plate 5. Note that, 10 in FIG. 1 indicates a seal material.

The insulating plate 5 has light transmissivity, which is, for example, made of a material such as glass, quartz and plastic. Further, the first liquid crystal layer 8 is a dichroic-dye/liquid-crystal/polymer complex layer which is made up of a liquid crystal molecule 8a of nematic liquid crystal having positive dielectric anisotropy, a so-called p-type dichroic dye 8b which has a transitional dipole moment substantially parallel to a long axis of the molecule, and a polymer 8c which is a polymer resin material cured in an orientation direction. Namely, the first liquid crystal display layer 2 is a liquid crystal display element employing a GH-type display mode in which the polymer is dispersed.

The first upper transparent electrode 6a is provided in contact with the surface 5a of the insulating plate 5 on the side where the first liquid crystal layer 8 is provided. The first upper transparent electrode 6a is formed with, for example, a varistor using zinc oxide (ZnO) or an ITO (Indium Tin Oxide) electrode including a switching element as realized by a two-terminal element such as an MIM (Metal Insulator Metal) element using tantalum oxide ($Ta_2O_5$). In addition, the first lower transparent electrode 6b which is placed symmetrically with the first upper transparent electrode 6a with respect to the first liquid crystal layer 8 is, like the first upper transparent electrode 6a, made up of the ITO electrode.

Note that, the switching element of the two-terminal element is used here, but other switching elements such as a three-terminal element (a-Si-TFT or LPS, etc.) can also be used.

The first upper orientation membrane 7a is provided on the first upper transparent electrode 6a, and is made of, for example, polyimide resin. An orientation treatment, for example, by rubbing is performed on a surface of the first upper orientation membrane 7a on the side where the first liquid crystal layer 8 is provided in order to horizontally orient the liquid crystal molecules 8a of the first liquid crystal layer 8 in one direction with respect to the insulating plate 5. Further, the first lower orientation membrane 7b which is placed symmetrically with the first upper orientation membrane 7a with respect to the first liquid crystal layer 8 is, like the first upper orientation membrane 7a, made of, for example, polyimide resin, and a surface of the first lower orientation membrane 7b is subjected to the orientation treatment such as rubbing in order to horizontally orient the liquid crystal molecules 8a in one direction with respect to the insulating plate 5.

Next, the following will explain the second liquid crystal display layer 4. The second liquid crystal display layer 4 is made up of an insulating plate 11, a reflector 12, a second lower transparent electrode 13a, a second lower orientation membrane 14a, a second liquid crystal layer 15, a second upper orientation membrane 14b, a second upper transparent electrode 13b, a phase difference plate 16 and a polarizer 17, which are provided in this order on a surface 11a of the insulating plate 11 from the side of the insulating plate 11. The second liquid crystal display layer 4 is a reflection-type liquid crystal display element adopting a single-polarizer system, in which the polarizer 17, phase difference plate 16 and second liquid crystal layer 15 are set to perform display in a normally black mode. Further, the second liquid crystal layer 15 is composed of, for example, a TN (Twisted Nematic) type liquid crystal layer.

Note that, the reflection-type liquid crystal display element of a single-polarizer system which is used in the present embodiment is disclosed in Japanese Unexamined Patent Publication No. 218906/1995 (Tokukaihei 7-218906 published on Aug. 18, 1995). This reflection-type liquid crystal display element adopts an ECB (Electric-field Control Birefringence) mode employing one polarizer (in Nakamura et al., 18th Liquid Crystal Forum 3D110), in which the polarizer 17, phase difference plate 16, second liquid crystal layer 15 and reflector 12 are stacked in this order.

In the foregoing reflection-type liquid crystal element, in the dark state, apparent retardation $\Delta n \cdot d$ in the case of combining the phase difference plate 16 and second liquid crystal layer 15 satisfies the condition of $\lambda/4$. Therefore, the linearly polarized light having an oscillation direction which is parallel to the direction of the transmitted axis of the polarizer 17 is incident on the polarizer 17, and becomes circularly polarized light having one rotational direction after passing through the phase difference plate 16 and second liquid crystal layer 15, and after being reflected at the reflector 12, becomes circularly polarized light rotating in the reverse direction. Further, after passing through the second liquid crystal layer 15 and phase difference plate 16, this circularly polarized light rotating in the reverse direction becomes linearly polarized light with a 90° rotation with respect to the direction of the linearly polarized light at the time of incidence, then, the light is blocked at the polarizer 17.

In contrast, in the bright state, since the apparent retardation $\Delta n \cdot d$ is 0, the linearly polarized light incident on the polarizer 17 passes through the phase difference plate 16 and second liquid crystal layer 15, and its polarization state does not change even after the reflection at the reflector 12, and further, the reflected light passes through the polarizer 17 after passing through the second liquid crystal layer 15 and phase difference plate 16.

Thus, the reflection-type liquid crystal display element employing the single-polarizer ECB mode can realize the bright and dark display.

Note that, the left side of the reflection-type LCD device 1 of FIG. 1 shows the reflection-type LCD device 1 in dark state. On the other hand, the right side of the reflection-type LCD device 1 shows the reflection-type LCD device 1 in bright state.

Figure 2:
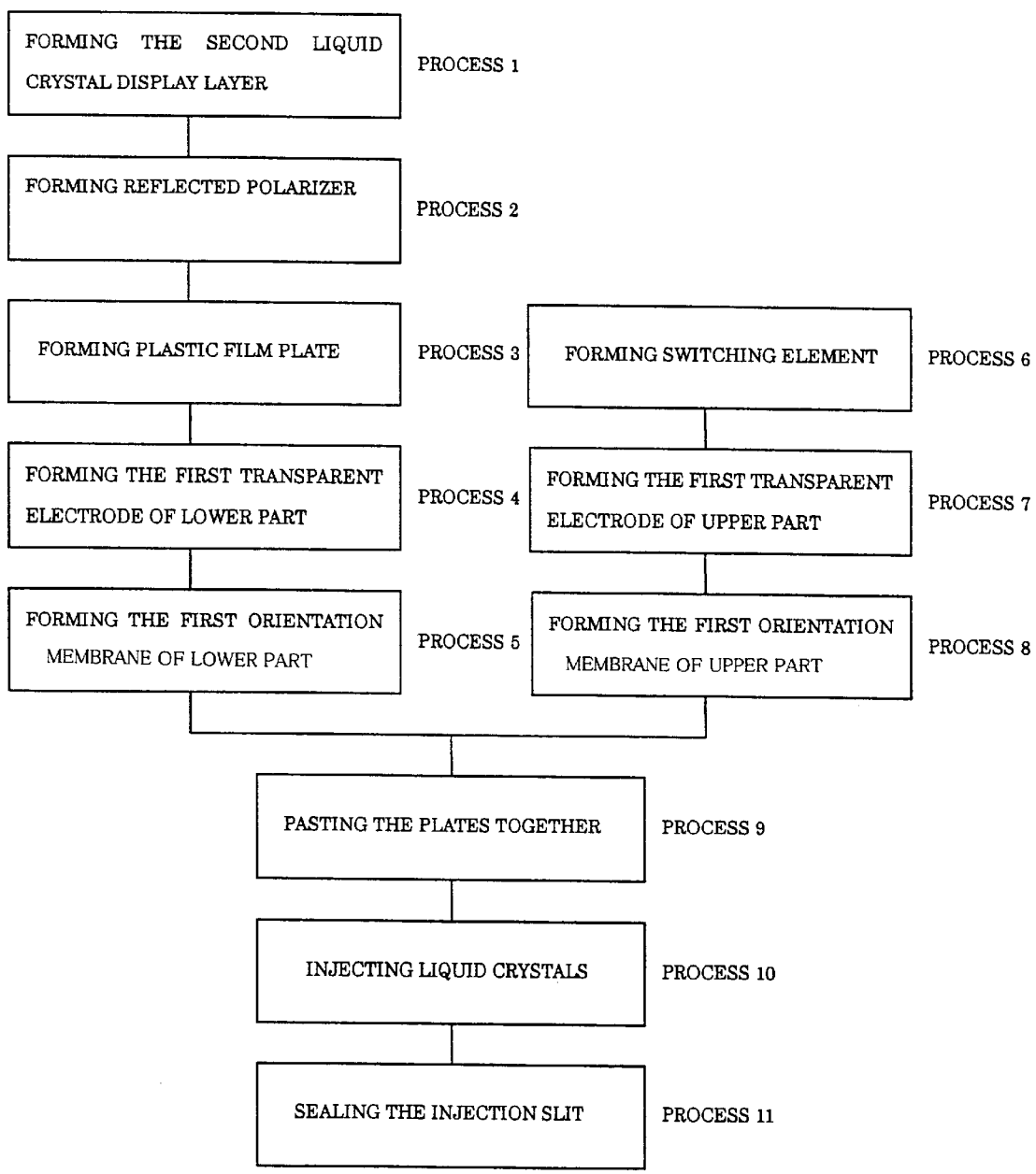
FIG. 2 is a flow chart showing manufacturing processes of the reflection-type liquid crystal display device.

Next, referring to a flow chart of FIG. 2, manufacturing steps of the reflection-type LCD device 1 according to the present embodiment will be explained below.

First, in step 1, the second liquid crystal display layer 4 is formed. Initially, the reflector 12 is formed on the insulating plate 11. Further, on the reflector 12 are formed the second lower transparent electrode 13a and lower orientation membrane 14a in order, from the side of the reflector 12. The second lower transparent electrode 13a is composed of an ITO membrane, and in the present embodiment, for example, it is formed by depositing the ITO membrane having a film thickness of 2,000 Å by a spattering method. Further, the second lower orientation membrane 14a having a film thickness of 800 Å is formed by depositing an orientation membrane, which is, for example, made of polyimide resin, over a whole area of a surface of the insulating plate 11 having the reflector 12 and second lower orientation membrane 14a formed thereon, by performing spin-coating, preferably at the rotational speed of 500 rpm to 4,000 rpm, and by applying rubbing on the surface of the deposited orientation membrane after baking it for an hour at 220° C.

Furthermore, on the second lower orientation membrane 14a are formed the second liquid crystal layer 15, second upper orientation membrane 14b and second upper transparent electrode 13b. Like the foregoing second lower transparent electrode 13a, this second upper transparent electrode 13b is made up of the ITO membrane. Further, like the second lower orientation membrane 14a, the second upper orientation membrane 14b is made up of polyimide resin.

Further, on the second upper orientation membrane 14b are formed the phase difference plate 16 and polarizer 17 in order.

In step 2, the reflecting polarizer 3 is formed on the polarizer 17 of the second liquid crystal display layer 4 which was made in step 1. The reflecting polarizer 3 is formed by applying an acrylic liquid crystal polymer solution to the polarizer 17 by a spinner, and depositing it to a thickness of 0.62 $\mu$m.

In step 3, the plastic film plate 9 is formed on the reflecting polarizer 3.

In step 4, the first lower transparent electrode 6b is formed on the plastic film plate 9. After depositing the ITO over the whole area of a surface of the plastic film plate 9 by the spattering method, a pattern of the first lower transparent electrode 6b is formed by a photolithography method.

In step 5, on the first lower transparent electrode 6b is formed the first lower orientation membrane 7b. After depositing the polyimide resin over the whole area of a surface of the first lower transparent electrode 6b, the first lower orientation membrane 7b is formed by applying rubbing on the deposited surface of the first lower transparent electrode 6b.

The following steps 6 through 8 are carried out in parallel with the foregoing steps 1 through 5.

In step 6, on the surface 5a of the insulating plate 5 is formed the switching element as realized by the two-terminal element such as, for example, a varistor using zinc oxide (ZnO) or MIM (Metal Insulator Metal) element using tantalum oxide ($Ta_2O_5$)

In step 7, on the surface 5a of the insulating plate 5 having the switching element thereon is deposited the ITO by the spattering method, then, by patterning it by the photolithography method, the first upper transparent electrode 6a is formed.

In step 8, on the first upper transparent electrode 6a is formed the first upper orientation membrane 7a. The first upper orientation membrane 7a is formed in the same manner as that of the first lower orientation membrane 7b explained in step 5.

In step 9, a lower substrate 18 (see FIG. 1) of the first liquid crystal display layer 2, which was made in steps 1 through 5 and has the second liquid crystal display layer 4 and reflecting polarizer 3 thereon, and an upper substrate 19 (see FIG. 1) of the first liquid crystal display layer 2, which was made in steps 6 through 8, are pasted together with the seal material 10. First, the upper substrate 19 and lower substrate 18 are disposed so that the first lower orientation membrane 7b and first upper orientation membrane 7a face each other, while the first lower orientation membrane 7b and the first upper orientation membrane 7a have parallel orientation directions. Here, a plastic spacer, for example, having a diameter of 8 $\mu$m is provided between the upper substrate 19 and lower substrate 18 so as to maintain a constant spacing therebetween.

In step 10, between the upper substrate 19 and lower substrate 18 is injected a liquid crystal including the p-type dichroic dye 8b, thereby forming the first liquid crystal layer 8. Here, in addition, the polymer 8c which is a polymer resin material is injected simultaneously.

In step 11, an injection slit used to inject the liquid crystal in step 10 is sealed.

By the foregoing steps, the reflection-type LCD device 1 is manufactured.

Figure 3:
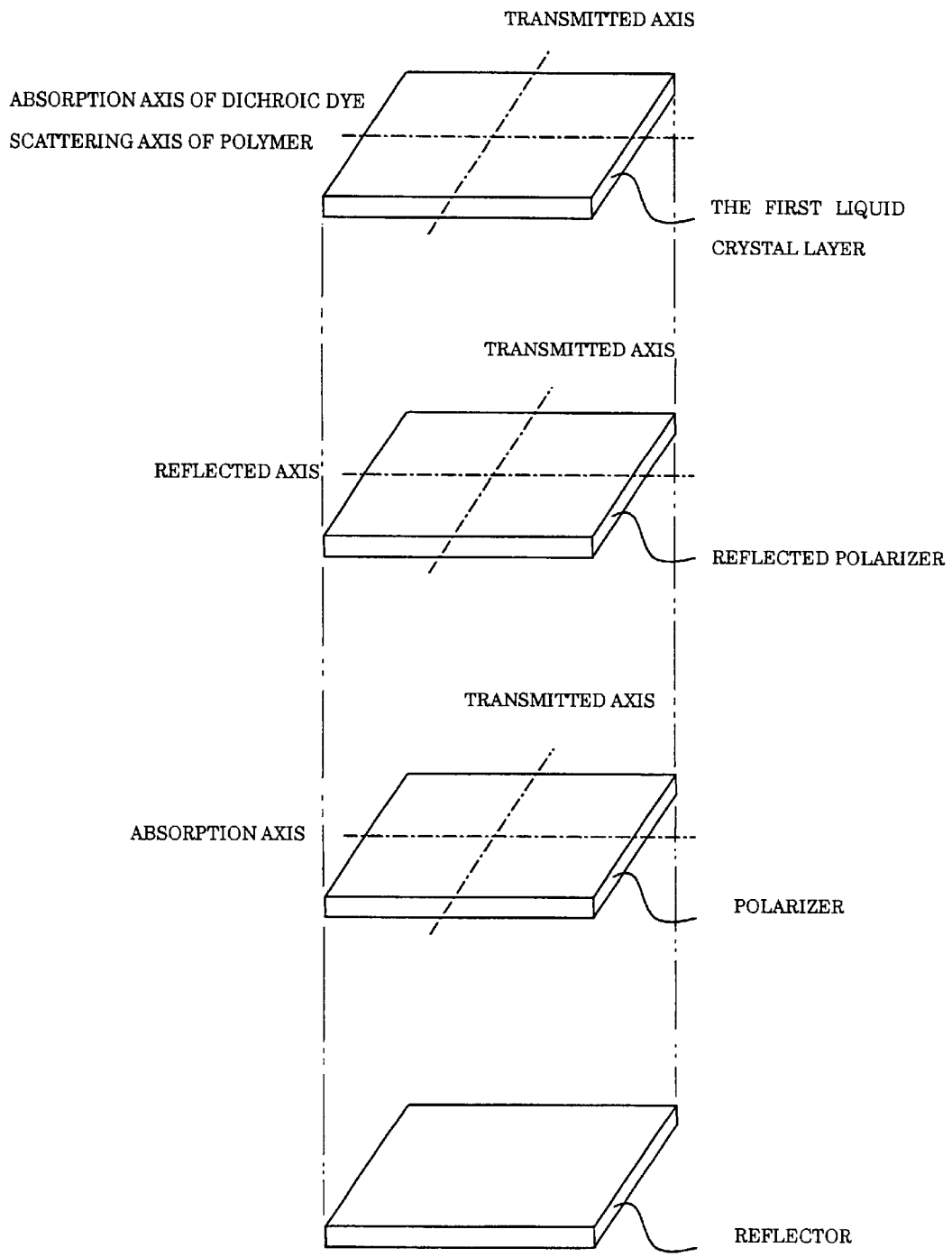
FIG. 3 is an explanatory drawing showing a positional relationship of a liquid crystal layer, a reflecting polarizer, a polarizer and a reflector, which make up the reflection-type liquid crystal display device.

Next, in the reflection-type LCD device 1, the first liquid crystal layer 8, reflecting polarizer 3, polarizer 17 and reflector 12 are disposed as shown in FIG. 3, that is, in such a manner that respective transmitted axes of the first liquid crystal layer 8, reflecting polarizer 3 and polarizer 17 are lined up, i.e. coincide with one another. By thus lining up the transmitted axes, the linearly polarized light having the oscillation direction in the same direction as that of the transmitted axes can reach the reflector 12 at the lower part, thereby realizing a clear distinction between the bright and dark states according to a voltage control in the first liquid crystal layer 8 and second liquid crystal layer 15.

Next, the following will explain an operation of performing black and white display in the reflection-type LCD device 1 according to the present embodiment with reference to FIGS. 4(a) and 4(b). FIG. 4(a) indicates a state where no voltage is applied to the first liquid crystal layer 8 and the second liquid crystal layer 15 in the reflection-type LCD device 1, while FIG. 4(b) indicates a state where the voltage is applied in the first liquid crystal layer 8 and the second liquid crystal layer 15 in the reflection-type LCD device 1. Note that, surrounding light 20 considered here is to have (a) linearly polarized light 20a having an oscillation direction in a direction of respective long axes of the liquid crystal molecule 8a and a molecule of the p-type dichroic dye 8b of the first liquid crystal layer 8, and (b) linearly polarized light 20b having an oscillation direction orthogonally intersecting the oscillation direction of the linearly polarized light 20a.

As shown in FIG. 4(a), when applying no voltage, the liquid crystal molecule 8a of the first liquid crystal layer 8 is oriented along the orientation direction of the first upper orientation membrane 7a and the first lower orientation membrane 7b, i.e. in a direction parallel to the insulating plate 5. In addition, the ptype dichroic dye 8b of the first liquid crystal layer 8 is also oriented in the same manner as the liquid crystal molecule 8a. Also, a liquid crystal molecule of the second liquid crystal layer 15 is twist-oriented, maintaining its initial orientation.

The following will explain an operation mechanism of the reflection-type LCD device 1 when applying no voltage. When the light 20 which is incident from the insulating plate 5 of the first liquid crystal display layer 2 is incident on the first liquid crystal layer 8, a component of the light 20, i.e. the linearly polarized light 20a having an oscillation direction in a direction parallel to the long axis direction of the molecule of the p-type dichroic dye 8b is absorbed by the p-type dichroic dye 8b. A small quantity of the linearly polarized light 20a is transmitted, failing to be absorbed by the p-type dichroic dye 8b. However, since the small quantity of the linearly polarized light 20a thus transmitted through the first liquid crystal layer 8 is scattered at the polymer 8c and transmitted as scattering light, it is reflected at the reflecting polarizer 3 of the lower part, and absorbed by the p-type dichroic dye 8b when passing through the first liquid crystal layer 8 again.

Further, the linearly polarized light 20b having an oscillation direction in the direction orthogonally intersecting the long axis direction of the molecule of the p-type dichroic dye 8b is transmitted through the first liquid crystal layer 8 and incident on the reflecting polarizer 3. Since the linearly polarized light 20b has its oscillation direction in the transmitted axis direction of the reflecting polarizer 3, it is transmitted through the reflecting polarizer 3 while maintaining its polarization plane. As discussed, since the transmitted axis of the polarizer 17 is lined up with that of the reflecting polarizer 3, the linearly polarized light 20b transmitted through the reflecting polarizer 3 is also transmitted through the polarizer 17. Likewise, the linearly polarized light 20b is also transmitted through the phase difference plate 16. After passing through the second liquid crystal layer 15, the linearly polarized light 20b becomes circularly polarized light. Reflected at the reflector 12, the circularly polarized light becomes the circularly polarized light rotating in the reverse direction, and, further, after passing through the second liquid crystal layer 15 and phase difference plate 16, the circularly polarized light rotating in the reverse direction becomes the linearly polarized light with a 90° rotation with respect to the linearly polarized light 20b when passing through the polarizer 17, thereby being blocked at the polarizer 17.

As discussed, when applying no voltage, both of the linearly polarized light 20a and 20b of the incident light on the reflection-type LCD device 1 are absorbed and do not emerge, thereby achieving the dark state.

On the other hand, as shown in FIG. 4(b), when applying the voltage to both of the first liquid crystal layer 8 and the second liquid crystal layer 15, the liquid crystal molecule 8a and the molecule of the p-type dichroic dye 8b of the first liquid crystal layer 8 are oriented along the voltage direction, i.e. in the perpendicular direction with respect to the upper substrate 19 and lower substrate 18. In addition, the liquid crystal molecule of the second liquid crystal layer 15 is also oriented in the perpendicular direction with respect to the insulating plates 5 and 11.

The linearly polarized light 20a incident from the side of the insulating plate 5 is scattered by the first liquid crystal layer 8. This scattering light is incident on the reflecting polarizer 3 while maintaining its polarization plane, i.e. with its oscillation direction maintained in the same direction as a reflection axis direction of the reflecting polarizer 3, and thereby the scattering light is reflected efficiently, then, scattered by the first liquid crystal layer 8 again before emerging.

Further, after being transmitted through the first liquid crystal layer 8 and reflecting polarizer 3 without being absorbed by the p-type dichroic dye 8b, the linearly polarized light 20b incident from the side of the insulating plate 5 is incident on the second liquid crystal layer 15. In the second liquid crystal layer 15 when applying the voltage, a phase difference does not occur in the liquid crystal layer. Therefore, the incident light passes through while maintaining its polarization state, and returns without changing its original state of polarization by being reflected, thereby emerging from the second liquid crystal layer 15. The linearly polarized light 20b thus emerged from the second liquid crystal layer 15 can emerge by further passing through the reflecting polarizer 3 and the first liquid crystal layer 8.

Thus, both of the linearly polarized light 20a and 20b incident on the reflection-type LCD device 1 according to the present embodiment when applying the voltage emerge, thereby achieving the desirable bright state.

Figure 5A:
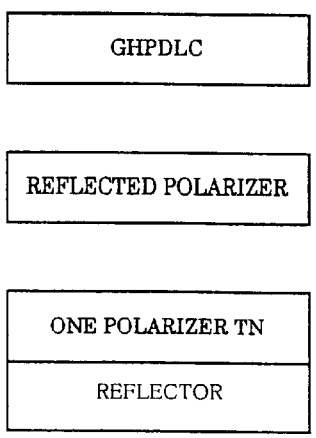
FIG. 5(a) is an explanatory drawing showing measurement results with regard to brightness and contrast of the reflection-type liquid crystal display device.
Figure 5B:
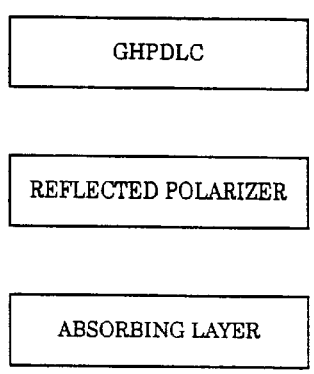
FIGS. 5(b) and 5(c) are explanatory drawings showing measurement results with regard to brightness and contrast of reflection-type liquid crystal display devices introduced as Comparative Examples.
Figure 5C:
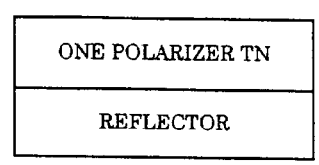

Here, in order to compare contrast and brightness of the reflection-type LCD device 1 according to the present embodiment with a reflection-type LCD device having another arrangement, the respective reflection-type LCD devices were actually prepared to measure the respective contrast and brightness by using a spectrophotometric colorimetry system CM-1000R manufactured by Minolta, which results are as shown in FIGS. 5(a) through 5(c). FIG. 5(a)

shows a simplified arrangement and measurement results of the reflection-type LCD device 1 according to the present embodiment. In addition, FIG. 5(b), as a Comparative Example 1, shows a simplified arrangement and measurement results of a reflection-type LCD device in which the one polarizer TN type liquid crystal element, which is the second liquid crystal display layer 4 in the reflection-type LCD device 1, is replaced with an absorbing layer. Further, FIG. 5(c), as a Comparative Example 2, shows a simplified arrangement and measurement results of a reflection-type LCD device having a sole one polarizer TN in which a one polarizer TN type liquid crystal display element includes a reflector. Note that, "GHPDLC" shown in the drawings refers to the first liquid crystal display layer 2.

As a result of each measurement, the reflection-type LCD device 1 of the present embodiment could obtain display having the brightness of 15.8% and the contrast of 17.6. In addition, the reflection-type LCD device of the Comparative Example 1 showed the brightness of 5.3% and the contrast of 9.4. Further, the reflection-type LCD device of the Comparative Example 2 showed the brightness of 9.3% and the contrast of 7.4.

Thus, the reflection-type LCD device 1 according to the present embodiment has an arrangement including the polymer dispersed liquid crystal display element employing the GH-type display mode as the first liquid crystal display layer 2, the one polarizer TN type liquid crystal display element as the second liquid crystal display layer 4, wherein the first liquid crystal display layer 2, the reflecting polarizer 3 and the second liquid crystal display layer 4 are stacked so that the transmitted axes of which substantially line up. Accordingly, the linearly polarized light which was absorbed in the conventional arrangement can emerge so as to contribute to increase the brightness of the display device, thereby increasing the brightness far greater than the conventional arrangements while improving the contrast.

[Second Embodiment]

The following will explain a Second Embodiment of the present invention with reference to FIGS. 6 through 8(a) and 8(b). For ease of explanation, components which are common to the reflection-type LCD device 1 according to the First Embodiment above will be given the same reference numerals, and explanation thereof will be omitted here.

Figure 6:
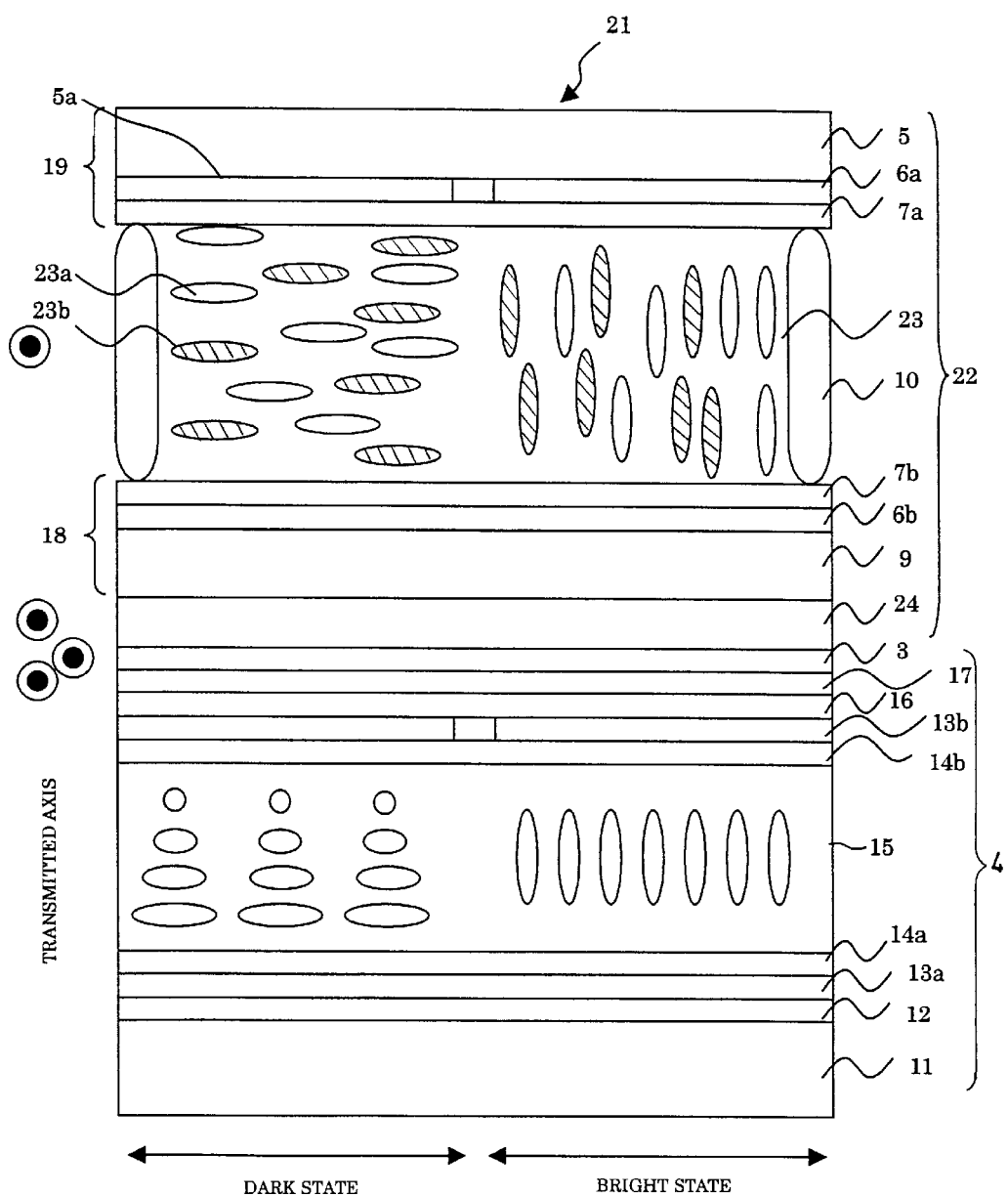
FIG. 6 is a cross sectional view showing a structure of a reflection-type liquid crystal display device according to a Second Embodiment of the present invention.

FIG. 6 is a cross sectional view showing a structure of a reflection-type liquid crystal display (LCD) device 21 according to the present embodiment. As shown in FIG. 6, the reflection-type LCD device 21 includes a first liquid crystal display layer 22, the reflecting polarizer 3 and the second liquid crystal display layer 4.

The first liquid crystal display layer 22 includes a first liquid crystal layer 23 instead of the first liquid crystal layer 8 of the first liquid crystal display layer 2 in the First Embodiment above, and further, has an arrangement in which an anisotropic scattering membrane 24 is provided on the plastic film plate 9. Other than that, the first liquid crystal display layer 22 has the same arrangement as that of the first liquid crystal display layer 2 of the First Embodiment.

The first liquid crystal layer 23 is a dichroicdye/liquid-crystal complex layer which is made up of a liquid crystal molecule 23a of the nematic liquid crystal having positive dielectric anisotropy, and a so-called p-type dichroic dye 23b which has the transitional dipole moment substantially parallel to the long axis of the molecule. That is, the first liquid crystal display layer 22 is a liquid crystal element employing the GH-type display mode.

In addition, the anisotropic scattering membrane 24 is provided so as to scatter the linearly polarized light 20a having its oscillation direction in the long axis direction of the liquid crystal molecule 23a and a molecule of the p-type dichroic dye 23b, when applying no voltage. The anisotropic scattering membrane 24 is formed either one of (i) a complex of oriented liquid crystal and polymer, (ii) a stretched complex of the oriented liquid crystal and the polymer, (iii) a complex of a liquid crystal polymer and particles, (iv) a complex of a polymer and particles, and (v) a stretched complex of polymers.

Figure 7:
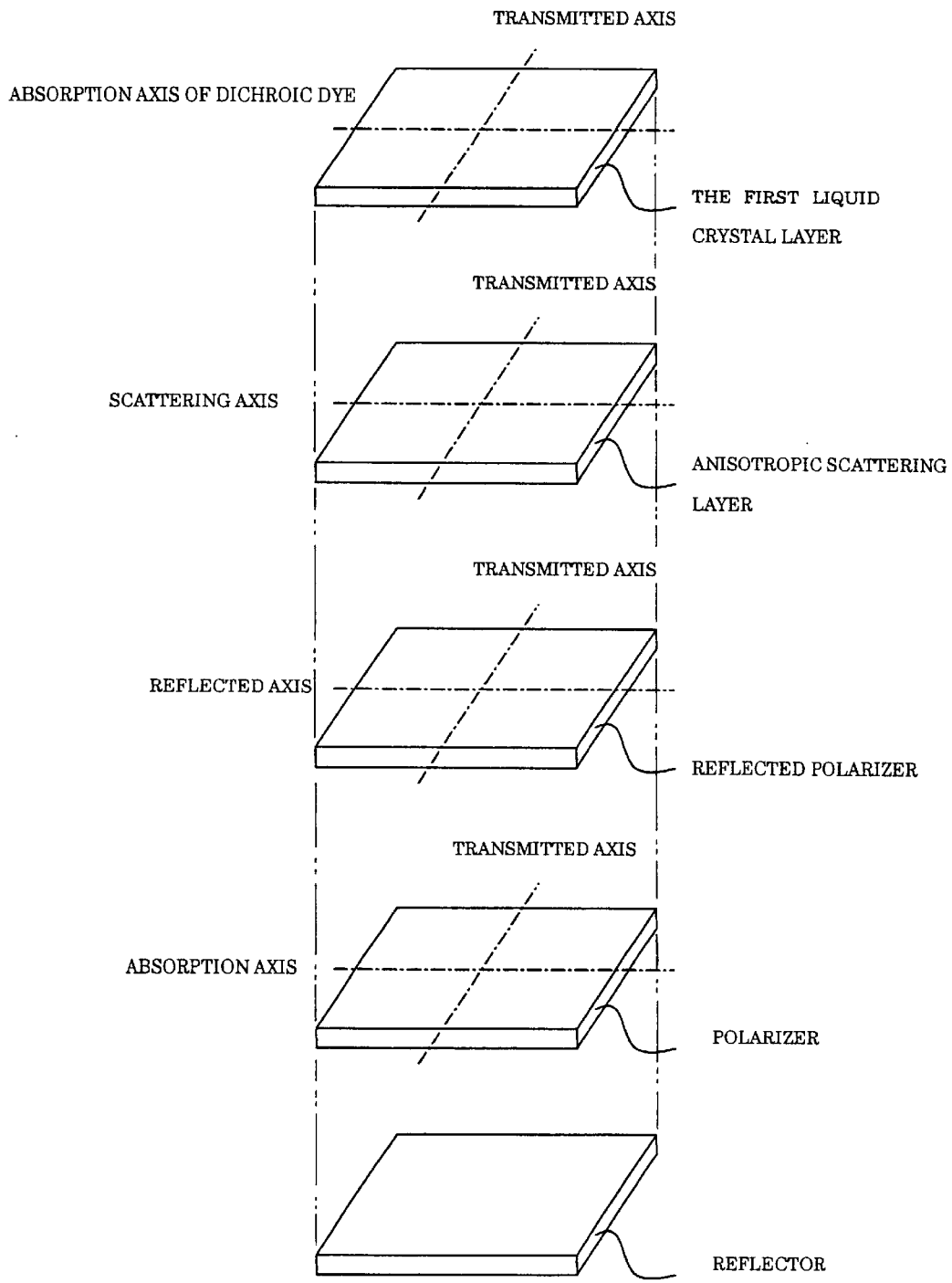
FIG. 7 is an explanatory drawing showing a positional relationship of a liquid crystal layer, an anisotropic scattering membrane, a reflecting polarizer, a polarizer and a reflector, which make up the reflection-type liquid crystal display device.
Figure 9:
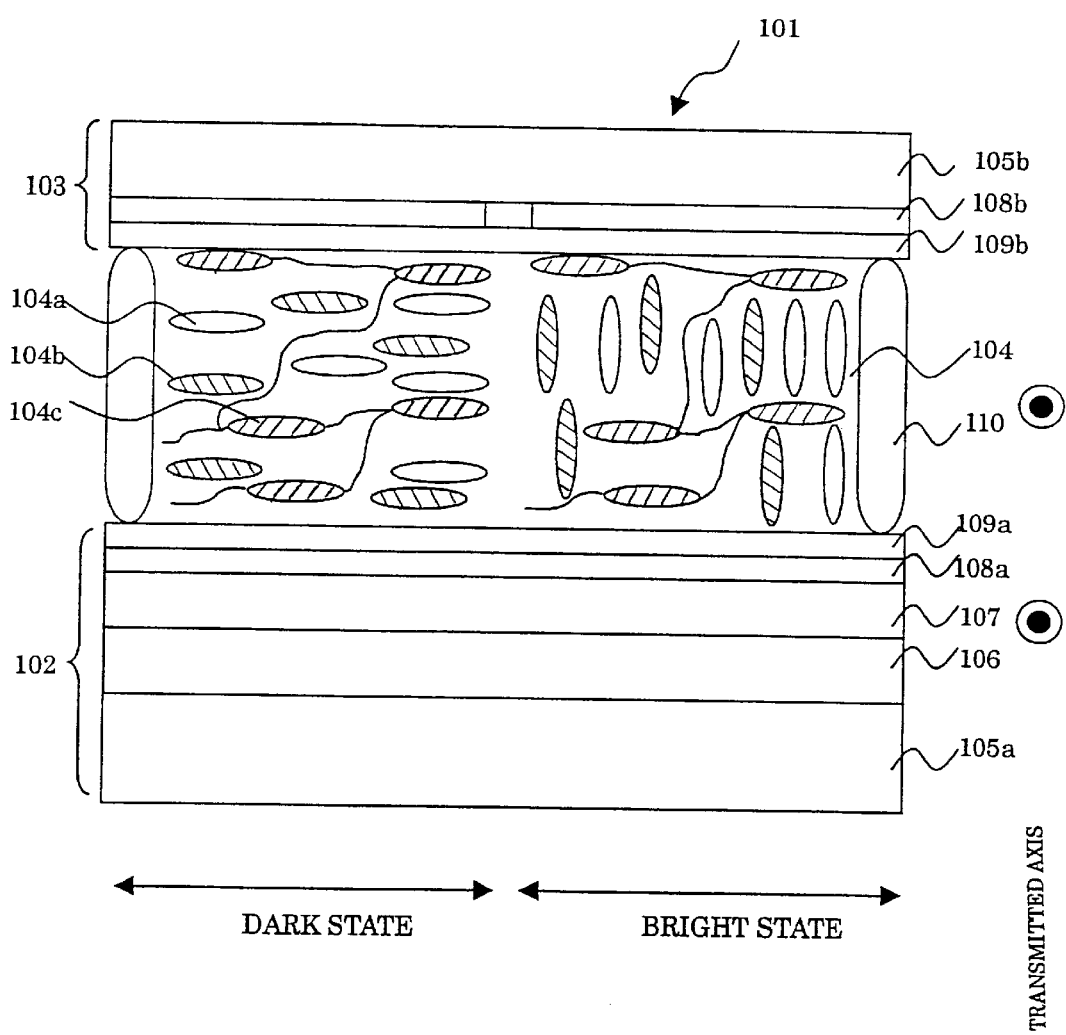
FIG. 9 is a cross sectional view showing a structure of a conventional reflection-type liquid crystal display device.

Furthermore, as shown in FIG. 7, the first liquid crystal layer 23, anisotropic scattering membrane 24, reflecting polarizer 3 and polarizer 17 of the second liquid crystal display layer 4 are disposed so that the respective transmitted axes thereof are lined up, i.e. coincide with one another. Thus lining up the transmitted axes enables the linearly polarized light having an oscillation direction in a direction parallel to the transmitted axes to reach the reflector 12 of the lower part, thereby clearly distinguishing between the bright state and the dark state by controlling the voltage in the first liquid crystal layer 23 and second liquid crystal layer 15.

Next, the following will explain an operation of performing black and white display by using the reflection-type LCD device 21 according to the present embodiment with reference to FIGS. 8(a) and 8(b). FIG. 8(a) shows a state of the reflection-type LCD device 21 when applying no voltage to the first liquid crystal layer 23 and the second liquid crystal layer 15, and FIG. 8(b) shows a state of the reflection-type LCD device 21 when applying the voltage to the first liquid crystal layer 23 and the second liquid crystal layer 15. Note that, the surrounding light 20 considered here is to have (a) linearly polarized light 20a having the oscillation direction in the direction of respective long axes of the liquid crystal molecule 23a and the molecule of the p-type dichroic dye 23b of the first liquid crystal layer 23, and (b) linearly polarized light 20b having the oscillation direction orthogonally intersecting the oscillation direction of the linearly polarized light 20a.

As shown in FIG. 8(a), when applying no voltage, the liquid crystal molecule 23a of the first liquid crystal layer 23 is oriented along the orientation treatment direction of the first upper orientation membrane 7a and the first lower orientation membrane 7b, i.e. in the direction parallel to the insulating plate 5. Likewise, the p-type dichroic dye 23b of the first liquid crystal layer 23 is also oriented as in the case of the liquid crystal molecule 23a. Also, the liquid crystal molecule of the second liquid crystal layer 15 is twist-oriented, maintaining its initial orientation.

The following will explain an operational mechanism of the reflection-type LCD device 21 when applying no voltage. When the light 20 incident from the insulating plate 5 of the first liquid crystal display layer 22 is incident on the first liquid crystal layer 23, a component of the light 20, i.e. the linearly polarized light 20a having an oscillation direction in a direction parallel to the long axis direction of the molecule of the p-type dichroic dye 23b is absorbed by the p-type dichroic dye 23b. A small quantity of the linearly polarized light 20a is transmitted, failing to be absorbed by the p-type dichroic dye 23b. However, the small quantity of the linearly polarized light 20a thus transmitted through the liquid crystal layer 23 is reflected at the reflecting polarizer 3 of the lower part, and absorbed by the p-type dichroic dye 23b when passing through the first liquid crystal layer 23 again.

On the other hand, the linearly polarized light 20b having an oscillation direction in a direction orthogonally intersecting the long axis direction of the molecule of the p-type dichroic dye 23b is transmitted through the first liquid crystal layer 23, and incident on the anisotropic scattering membrane 24. Having an oscillation plane in a transmitted axis direction of the anisotropic scattering membrane 24, the linearly polarized light 20b is transmitted through the anisotropic scattering membrane 24 while maintaining its polarization plane, then, through the reflecting polarizer 3 in the same manner. As discussed, since the transmitted axis of the polarizer 17 is lined up with that of the reflecting polarizer 3, the linearly polarized light 20b which was transmitted through the reflecting polarizer 3 is also transmitted through the polarizer 17. Likewise, the linearly polarized light 20b is also transmitted through the phase difference plate 16 for the same reason. After passing through the second liquid crystal layer 15, the linearly polarized light 20b becomes circularly polarized light. Reflected at the reflector 12, the circularly polarized light becomes circularly polarized light rotating in the reverse direction, and, further, after passing through the second liquid crystal layer 15 and phase difference plate 16, the circularly polarized light rotating in the reverse direction becomes linearly polarized light with a 90° rotation with respect to the linearly polarized light 20b when passing through the polarizer 17, thereby being blocked at the polarizer 17.

As discussed, when applying no voltage, both of the linearly polarized light 20a and 20b of the light which is incident on the reflection-type LCD device 21 are absorbed by the reflection-type LCD device 21, thereby achieving the dark state.

On the other hand, as shown in FIG. 8(b), when applying the voltage to both of the first liquid crystal layer 23 and the second liquid crystal layer 15, the liquid crystal molecule 23a and the molecule of the p-type dichroic dye 23b of the first liquid crystal layer 23 are oriented along the voltage direction, i.e. in the perpendicular direction with respect to the insulating plates 5 and 11. In addition, the liquid crystal molecule of the second liquid crystal layer 15 is also oriented in the perpendicular direction with respect to the insulating plates 5 and 11.

The linearly polarized light 20a incident from the side of the insulating plate 5 is scattered by the anisotropic scattering membrane 24. This scattering light is incident on the reflecting polarizer 3 while maintaining its polarization plane, i.e. while maintaining its oscillation direction in the same direction as the reflection axis direction of the reflecting polarizer 3, and thereby the scattering light is reflected efficiently, then, scattered by the anisotropic scattering membrane 24 again before emerging from the first liquid crystal layer 23.

Further, after being transmitted through the first liquid crystal layer 23, anisotropic scattering membrane 24 and reflecting polarizer 3 without being absorbed by the p-type dichroic dye 23b, the linearly polarized light 20b incident from the side of the insulating plate 5 is incident on the second liquid crystal layer 15. In the second liquid crystal layer 15 when applying the voltage, the phase difference does not occur. Therefore, the incident light passes through while maintaining its polarization state, and returns without changing its original polarization state by being reflected, i.e. the incident light can pass through the second liquid crystal layer 15. The linearly polarized light 20b thus having passed through the second liquid crystal layer 15 can then pass through the reflecting polarizer 3 and the first liquid crystal layer 23 so as to emerge.

Thus, both of the linearly polarized light 20a and 20b of the light incident on the reflection-type LCD device 21 according to the present embodiment when applying the voltage emerge, thereby achieving a desirable bright state.

Here, the reflection-type LCD device 21 was actually prepared to measure the contrast and brightness thereof by the spectrophotometric colorimetry system CM-1000R manufactured by Minolta, with the measurement results that the brightness was 15.6%, and the contrast was 16.4. By comparing this measurement result with those of the reflection-type LCD device of the Comparative Example 1 in the First Embodiment, it is evident that both brightness and contrast are improved in the reflection-type LCD device 21 according to the present embodiment.

Thus, since the reflection-type LCD device 21 according to the present embodiment is of the GH-type display mode, and has an arrangement in which the liquid crystal display element further including the anisotropic scattering membrane 24 is the first liquid crystal display layer 22, and the one-polarizer TN type liquid crystal display element is the second liquid crystal display layer 4, wherein the first liquid crystal display layer 22, reflecting polarizer 3 and second liquid crystal display layer 4 are stacked with the transmitted axes thereof being substantially lined up, making it possible to allow the linearly polarized light, which was absorbed conventionally, to emerge to contribute to increase the brightness of the display device, thereby increasing the brightness far greater than the conventional arrangements while improving the contrast.

Note that, the liquid crystal layer in which the polymer resin material is not provided was adopted as the first liquid crystal layer 23 in the present embodiment; however, the first liquid crystal layer 8 used in the First Embodiment can be adopted as well.

Note that, in the present embodiment of the present invention, as a material used for the first liquid crystal display layers 2 and 22 was used a positive liquid crystal material which allows molecules to rise in response to the voltage so as to have normally black display; however, it is also possible to adopt a negative liquid crystal material which is initially oriented perpendicular to the orientation membrane and which allows molecules to lie in substantially the same direction in response to an application of a voltage. Also, the combination of the negative liquid crystal material and the second liquid crystal display layer 4 which is set as "normally white" can realize the normally white display.

Further, in the present embodiment, only the positive liquid crystal material was described with regard to the liquid crystal material used for the second liquid crystal layer 15; however, this can also be replaced with a negative perpendicular orientation material. Namely, the second liquid crystal display layer 4 can be the one-polarizer mode liquid crystal display element adopting a perpendicular orientation liquid crystal.

As discussed, in order to achieve the foregoing object, the reflection-type LCD device of the present invention is made up of:

a first liquid crystal display layer having a first liquid crystal layer which includes a liquid crystal material, a dichroic dye and an anisotropic scattering material, a reflecting polarizing layer which is disposed to transmit linearly polarized light having its polarization direction in a direction of a transmitted axis of the first liquid crystal display layer, and a second liquid crystal display layer including a polarizer which is disposed to transmit the linearly polarized light transmitted through the reflecting polarizing layer, a second liquid crystal layer capable of bright and dark display depending on presence or absence of an applied voltage, and a reflector, wherein the first liquid crystal display layer, reflecting polarizing layer and second liquid crystal display layer are stacked in this order on a side from which light is incident.

When the dichroic dye (Guest) is mixed with the liquid crystal material (Host), a long narrow molecule of the dichroic dye is aligned parallel to the molecule of the liquid crystal material. Accordingly, when the molecular alignment of the liquid crystal molecule is changed by applying an electric field, the molecular alignment of the dichroic dye is also changed with it, thus automatically controlling the absorbed quantity of visible light by the dichroic dye. A display mode of the liquid crystal display element thus utilizing an electro-optical effect is called a Guest Host (GH) type display mode. Combining the anisotropic scattering material which scatters linearly polarized light having a polarization direction (oscillation direction) in the same direction as an orientation direction of the liquid crystal material and dichroic dye with the first liquid crystal layer employing the GH-type display mode as above enables the first liquid crystal display layer to modulate scattering and transmission of the incident linearly polarized light by an application of the electric field.

The reflecting polarizing layer which is stacked on the first liquid crystal display layer is disposed to transmit linearly polarized light of one direction which is transmitted through the first liquid crystal display layer including the first liquid crystal layer as shown above, i.e. linearly polarized light which has the polarization direction (oscillation direction) coinciding with the transmitted axis direction of the first liquid crystal display layer. Namely, the reflecting polarizing layer is disposed in such a manner as to transmit linearly polarized light having one polarization direction as above, and reflect the other linearly polarized light having a polarization direction orthogonally intersecting it. Furthermore, the polarizer making up the second liquid crystal display layer is also disposed so as to transmit the linearly polarized light which passes through the reflecting polarizing layer. Further, since the liquid crystal layer capable of bright and dark display depending on presence or absence of an applied voltage is used as the second liquid crystal layer, the linearly polarized light which passes through the polarizer to be incident on the second liquid crystal layer either becomes circularly polarized light or passes through while maintaining its polarization state, depending on presence or absence of an applied voltage.

Suppose that the arrangement of the reflection-type LCD device as explained is a first arrangement of the present invention.

Here, the following will explain an operation of the reflection-type LCD device according to the present invention in the case where the liquid crystal material and dichroic dye are, for example, aligned in the orientation direction (here, suppose that it is parallel to the substrate) when applying no voltage, while they are aligned in a direction orthogonally intersecting in the orientation direction (here, suppose that it intersects perpendicularly to the substrate) when applying the voltage.

First, the following will explain the case where the voltage is not applied to both of the first and second liquid crystal layers.

When applying no voltage, the linearly polarized light incident on the first liquid crystal layer, i.e. linearly polarized light having a polarization direction (oscillation direction) in the same direction as the orientation direction of the liquid crystal material and dichroic dye, is either absorbed by the dichroic dye when passing through the first liquid crystal layer or scattered by the anisotropic scattering material. The scattering light which passed through the first liquid crystal layer is thereafter reflected at the reflecting polarizing layer, and then absorbed by the dichroic dye when passing through the first liquid crystal layer again, and thus essentially no light emerges from the device.

On the other hand, the linearly polarized light having a polarization direction orthogonally intersecting that of the above linearly polarized light is transmitted through the first liquid crystal layer without being absorbed by the dichroic dye upon incidence on the first liquid crystal layer. Thereafter, the linearly polarized light is also transmitted through the reflecting polarizing layer and the polarizer which makes up the second liquid crystal display layer so as to enter the second liquid crystal layer. When the second liquid crystal layer is, for example, made of a twisted nematic liquid crystal which changes the linearly polarized light into the circularly polarized light when applying no voltage, this circularly polarized light becomes circularly polarized light rotating in the reverse direction, after being reflected at the reflector. Consequently, when the circularly polarized light rotating in the reverse direction is incident on the polarizer again, after passing through the second liquid crystal layer, it becomes linearly polarized light having the polarization direction which is different by 90° with respect to the transmitted axis of the polarizer, and thereby the light is blocked by the polarizer.

Thus, in the state where the voltage is not applied, linearly polarized light having any polarization directions is absorbed and it does not emerge from the device, thereby realizing the dark state.

Next, the following will explain the case where the voltage is applied to both the first and second liquid crystal layers.

When applying the voltage, since the molecules of the liquid crystal material and dichroic dye both rise in the direction to intersect perpendicularly to the substrate, the foregoing linearly polarized light (linearly polarized light having the polarization direction in the same direction as the orientation direction of the liquid crystal material and dichroic dye) is not absorbed but scattered by the anisotropic scattering material when passing through the first liquid crystal layer, then, reflected at the reflecting polarizing layer and scattered by the first liquid crystal layer again, so as to emerge from the device.

On the other hand, the linearly polarized light whose polarization direction orthogonally intersects that of the above linearly polarized light is transmitted through the first liquid crystal layer, reflecting polarizing layer and polarizer, then, incident on the second liquid crystal layer. Since a phase difference does not occur in the second liquid crystal layer when applying the voltage, the linearly polarized light is transmitted through the second liquid crystal layer while maintaining its polarization state, and reflected at the reflector, and thereafter, it is transmitted again through the polarizer, reflecting polarizing layer and first liquid crystal layer, so as to emerge from the device.

As discussed, when applying the voltage, linearly polarized light having any polarization directions can emerge from the device, thereby contributing to a bright state of display.

Consequently, the dark state of display can surely be realized, while making sure, in the bright state, that the linearly polarized light of one direction, which was absorbed in the conventional arrangement, can emerge from the device, i.e. both of the linearly polarized light incident on the reflection-type LCD device can emerge from the device.

Note that, in both of the first and second liquid crystal layers, a positive liquid crystal material which allows the molecules of the liquid crystal material and dichroic dye to rise with respect to the voltage has been used through the foregoing explanation, but a negative liquid crystal material can undoubtedly be adopted as well.

Thus, a reflection-type LCD device having desirable display quality with highly improved brightness and contrast can be realized.

Further, in order to solve the foregoing problems, in the reflection-type LCD device of the present invention, the anisotropic scattering material is preferably made of the polymer resin material.

In the foregoing arrangement, since the liquid crystal material and polymer resin material have different refractive indices, the incident light is refracted and reflected at the interface of the two materials, thus scattering the incident light.

Thus, the incident light can be scattered effectively.

Further, in order to solve the foregoing problems, in the reflection-type LCD device of the present invention, the polymer resin material is preferably oriented in the same direction as the orientation direction of the liquid crystal material, regardless of presence or absence of an applied voltage.

In accordance with the foregoing arrangement, the order parameter of the liquid crystal material is maintained in the first liquid crystal display layer.

Consequently, display with high contrast can be realized.

Further, in order to solve the foregoing problems, the reflection-type LCD device of the present invention may have an arrangement which includes:

a first liquid crystal display layer having a first liquid crystal layer at least including a liquid crystal material, and a dichroic dye, and an anisotropic scattering membrane whose transmitted axis is disposed to transmit linearly polarized light which was transmitted through the liquid crystal layer;

a reflecting polarizing layer which is disposed to transmit the linearly polarized light transmitted through the first liquid crystal display layer; and a second liquid crystal display layer including a polarizer which is disposed to transmit the linearly polarized light transmitted through the reflecting polarizing layer, a second liquid crystal layer capable of bright and dark display depending on presence or absence of an applied voltage, and a reflector, wherein the first liquid crystal display layer, the reflecting polarizing layer and the second liquid crystal display layer are stacked in this order from a side from which light is incident.

Referring to this arrangement as a second arrangement of the reflection-type LCD device according to the present invention, the second arrangement realizes the first liquid crystal display layer by providing an anisotropic scattering membrane separately from the first liquid crystal layer and in replacement of the anisotropic scattering material in the first liquid crystal layer in the reflection-type LCD device having the first arrangement of the present invention, where the anisotropic scattering membrane is for transmitting linearly polarized light having a polarization direction (oscillation direction) in the same direction as an orientation direction of molecules of the liquid crystal material and dichroic dye of the first liquid crystal layer, and scattering linearly polarized light having a polarization direction which orthogonally intersects that of the above linearly polarized light. Accordingly, the reflection-type LCD device having the second arrangement of the present invention can also obtain the same effects as those of the reflection-type LCD device having the first arrangement. That is, while surely realizing the dark state of display, in the bright state, the linearly polarized light which was absorbed in the conventional arrangement emerges from the device, thus resulting in emergence of both of the linearly polarized light incident on the reflection-type LCD device.

Thus, the reflection-type LCD device having desirable display quality with highly improved brightness and contrast can be realized.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A reflection-type liquid crystal display device, comprising:

a first liquid crystal display layer having a first liquid crystal layer including a liquid crystal material, a dichroic dye and an anisotropic scattering material;

a reflecting polarizing layer which is disposed to transmit linearly polarized light having a polarization direction in a transmitted axis direction of said first liquid crystal display layer; and a second liquid crystal display layer including a polarizer which is disposed to transmit said linearly polarized light transmitted through said reflecting polarizing layer, a second liquid crystal layer capable of bright and dark display depending on presence or absence of an applied voltage, and a reflecting layer, wherein said first liquid crystal display layer, said reflecting polarizing layer and said second liquid crystal display layer are stacked in this order from a side from which light is incident.

2. The reflection-type liquid crystal display device as set forth in claim 1, wherein said anisotropic scattering material is made of a polymer resin material.

3. The reflection-type liquid crystal display device as set forth in claim 2, wherein said polymer resin material is oriented in the same direction as an orientation direction of said liquid crystal material, regardless of presence or absence of an applied voltage.

4. The reflection-type liquid crystal display device as set forth in claim 1, wherein:

said liquid crystal material is made of a nematic liquid crystal molecule having a positive dielectric anisotropy, and said dichroic dye has a transitional dipole moment which is substantially parallel to a long axis of said liquid crystal molecule.

5. The reflection-type liquid crystal display device as set forth in claim 1, wherein said second liquid crystal display layer further comprises a phase difference plate whose transmitted axis is disposed to transmit the linearly polarized light transmitted through said reflecting polarizing layer.

6. The reflection-type liquid crystal display device as set forth in claim 1, wherein said reflecting polarizing layer reflects linearly polarized light having a polarization direction orthogonally intersecting that of the linearly polarized light which is transmitted through a transmitted axis of said reflecting polarizing layer, while maintaining a polarization plane thereof.

7. The reflection-type liquid crystal display device as set forth in claim 6, wherein said reflecting polarizing layer is composed of an acrylic liquid crystal polymer.

8. The reflection-type liquid crystal display device as set forth in claim 1, wherein said second liquid crystal layer is composed of a twisted nematic liquid crystal.

9. The reflection-type liquid crystal display device as set forth in claim 5, wherein:
apparent retardation $\Delta n \cdot d$ of said second liquid crystal display layer is set to satisfy a condition of $\lambda/4$ in a dark state when said second liquid crystal layer is combined with the phase difference plate, and
the apparent retardation $\Delta n \cdot d$ satisfies a condition of 0 in a bright state when said second liquid crystal layer is combined with the phase difference plate.

10. A reflection-type liquid crystal display device, comprising: a first liquid crystal layer including a liquid crystal material, a dichroic dye and an anisotropic scattering material; a reflecting polarizing layer; a polarizer; a phase difference plate; a second liquid crystal layer; and a reflecting layer,
wherein said first liquid crystal layer, said reflecting polarizing layer and said polarizer have transmitted axis directions which coincide with one another, and
wherein said first liquid crystal layer, said reflecting polarizing layer, said polarizer, said phase difference plate, said second liquid crystal layer, and said reflecting layer are stacked in this order from a side from which light is incident.

11. A reflection-type liquid crystal display device, comprising:
a first liquid crystal display layer having a first liquid crystal layer at least including a liquid crystal material and a dichroic dye, and an anisotropic scattering membrane whose transmitted axis is disposed to transmit linearly polarized light which was transmitted through said first liquid crystal layer;
a reflecting polarizing layer which is disposed to transmit linearly polarized light having a polarization direction in a transmitted axis direction of said first liquid crystal display layer; and
a second liquid crystal display layer including a polarizer which is disposed to transmit said linearly polarized light transmitted through said reflecting polarizing layer, a second liquid crystal layer capable of bright and dark display depending on presence or absence of an applied voltage, and a reflecting layer,
wherein said first liquid crystal display layer, said reflecting polarizing layer and said second liquid crystal display layer are stacked in this order from a side from which light is incident.

12. The reflection-type liquid crystal display device as set forth in claim 11, wherein said first liquid crystal layer further comprises a polymer resin material.

13. The reflection-type liquid crystal display device as set forth in claim 12, wherein said polymer resin material is oriented in the same direction as an orientation direction of said liquid crystal material, regardless of presence or absence of an applied voltage.

14. The reflection-type liquid crystal display device as set forth in claim 11, wherein:
said liquid crystal material is composed of a nematic liquid crystal molecule having a positive dielectric anisotropy, and said dichroic dye has a transitional dipole moment which is substantially parallel to a long axis of said liquid crystal molecule.

15. The reflection-type liquid crystal display device as set forth in claim 11, wherein said second liquid crystal display layer further comprises a phase difference plate whose transmitted axis is disposed to transmit the linearly polarized light transmitted through said reflecting polarizing layer.

16. The reflection-type liquid crystal display device as set forth in claim 11, wherein said reflecting polarizing layer reflects linearly polarized light having a polarization direction orthogonally intersecting that of the linearly polarized light which is transmitted through a transmitted axis of said reflecting polarizing layer, while maintaining a polarization plane thereof.

17. The reflection-type liquid crystal display device as set forth in claim 16, wherein said reflecting polarizing layer is composed of an acrylic liquid crystal polymer.

18. The reflection-type liquid crystal display device as set forth in claim 11, wherein said second liquid crystal layer is composed of a twisted nematic liquid crystal.

19. The reflection-type liquid crystal display device as set forth in claim 15, wherein:
apparent retardation $\Delta n \cdot d$ of said second liquid crystal display layer is set to satisfy a condition of $\lambda/4$ in a dark state when said second liquid crystal layer is combined with the phase difference plate, and
the apparent retardation $\Delta n \cdot d$ satisfies a condition of 0 in a bright state when said second liquid crystal layer is combined with the phase difference plate.

20. The reflection-type liquid crystal display device as set forth in claim 11, wherein said anisotropic scattering membrane scatters linearly polarized light having a polarization direction orthogonally intersecting that of the linearly polarized light which is transmitted through a transmitted axis of said anisotropic scattering membrane, while maintaining a polarization plane thereof.

21. The reflection-type liquid crystal display device as set forth in claim 11, wherein said anisotropic scattering membrane is selected from the group consisting of (i) a complex of an oriented liquid crystal and a polymer, (ii) a stretched complex of a liquid crystal and a polymer, (iii) a complex of a liquid crystal polymer and particles, (iv) a complex of a polymer and particles, and (v) a stretched complex of polymers.

22. A reflection-type liquid crystal display device, comprising: a Guest Host liquid crystal layer; an anisotropic scattering membrane; a reflecting polarizing layer; a polarizer; a phase difference plate; a second liquid crystal layer; and a reflecting layer,
wherein said second liquid crystal layer, said reflecting polarizing layer and said polarizer have transmitted axis directions which coincide with one another, and
wherein said guest host liquid crystal layer, said anisotropic scattering membrane, said reflecting polarizing layer, said polarizer, said phase difference plate, said second liquid crystal layer, and said reflecting layer are stacked in this order from a side from which light is incident.

* * * * *